2,990,405
SPIRIT SOLUBLE BLACK DYES
Foster L. Pepper, Glen Side, Pa., and Norman W. Fiess, Ringoes, N.J., assignors to American Cyanamid Company, New York, N.Y., a corporation of Maine
No Drawing. Filed May 26, 1959, Ser. No. 815,804
7 Claims. (Cl. 260—267)

This invention relates to new black colorants for ball pen inks. More specifically, it relates to arylguanidine salts of sulfonated nigrosines, said sulfonated nigrosines having from 8 to 15% by weight sulfur content, there being from 0.5 to 1.0 moles of arylguanidines per atom of sulfur, the said aryl groups being carbocyclic 6-membered monocyclic aryl radicals free of salt forming groups.

Spirit soluble dyes with distinctive properties have achieved great importance as components of inks for ball pens. To be useful for such purposes the dyes must have a number of specific characteristics. First of all, the dyes must have a very high solubility in the vehicle used for the inks, at least sufficient solubility to give solutions with certain physical characteristics such as viscosity within a given range. Otherwise, the ink will not meet the requirements necessary in a modern ball pen. Another requirement is the absence of any gritty insoluble material. Such a requirement is sometimes difficult to achieve in large scale production. The presence of such insolubles is deleterious because of the abrasive and clogging effects on the ball pen mechanism. The dye must further have a very high degree of light fastness so that the ink will have sufficient permanence.

These requirements have been met in a number of dyes of various colors including the dark blues. However, the necessary characteristics and especially the light fastness requirements and solubility requirements have been difficult to achieve in dyes of a true jet black color. There is a definite need for truly black dyes with the necessary characteristic for ball pen inks.

Another deficiency of present day inks is that they do not reproduce well in infrared copying machines used today in industry. This is because the colors do not absorb infrared as do the carbon black etc. used in old fashioned inks. This is a further need in the field of colors in modern ball point inks.

We have found that the arylguanidine salts of highly sulfonated nigrosines provide dyes of superior light fastness and as well as possessing the other characteristics for use in ball pen inks, and that these salts give inks of jet black color. We have further found that these dyes possess a high solubility in the ball pen vehicles with a lack of insolubles.

Nigrosine (Color Index Numbers 684 and 685) is a black dyestuff produced by the oxidation of aniline and aniline hydrochloride in the presence of nitro compounds such as nitrobenzene and nitrophenols. This dye is described on pages 775 and 776 in volume 2 of the Chemistry of Synthetic Dyes by Venkataraman, Academic Press, New York, 1952. The unsulfonated nigrosines are used where oil soluble dyestuffs are required. The sulfonated nigrosines are used to some extent in leather dyeing, being water soluble. Vehicles for ball pen inks are organic solvents to a large extent such as Carbitol, 1,3-butylene glycol and propylene glycol. Ordinary nigrosines leave much to be desired as far as desirable properties are concerned particularly in relation to solubility and lack of insolubles in these vehicles which might permit them to be used as ball pen inks. It is therefore most surprising to find that sulfonated nigrosines in which the acid groupings are at least partly neutralized by aryl quanidines do possesses the required properties of solubility. It is furthermore surprising that it requires the more highly sulfonated nigrosines to achieve these properties.

The nigrosines to be used in our invention must be sulfonated to the extent that a sulfur content of at least 8% by weight is obtained. It is preferable that the sulfur content be larger than 10%. Above 15% there is no further improvement and such highly sulfonated nigrosines are difficult to obtain.

In a sulfonated nigrosine, each sulfur atom of course represents a sulfonic acid group. From 0.5 to 1.5 moles of an arylguanidine must be used per atom of sulfur to prepare the products of our invention, which of course, will have from 0.5 to 1.0 mole per sulfur atom. It is preferred that a minimum of 0.9 mole of arylguanidine per atom of sulfur be used.

The arylguanidine base used to form the salt of sulfonated nigrosines of our invention may be either a mono or a diaryl guanidine. Examples of such guanidine bases include both symmetrical and unsymmetrical diaryl guanidines such as diphenylguanidine, di-o-tolylguanidine, dixylylguanidine, phenyl-o-tolylguanidine, phenylylguanidine, mixed di-tolylguanidines, mixed dixylylguanidines and the like. They include also monoarylguanidines such as phenylguanidine, tolylguanidine, xylylguanidine and the like. Mixtures of several arylguanidines in various proportions may be used with good results. For best results it is preferred that mixed dixylylguanidines be used. This mixed dixylylguanidine is conveniently prepared by the reaction of cyanogen chloride with commercial mixed xylidines (a mixture of isomeric xylidines obtained by nitration and subsequent reduction of commercial grade xylene containing all of the possible isomers). The use of such mixed dixylylguanidines results in mixed amine salts of superior solubility characteristics in the solvent vehicles for ball pen ink formulation. The dyes of this invention are prepared by treating a sulfonated nigrosine in aqueous solution with an aqueous solution of acid salt of the arylguanidine, usually and preferably the hydrochloride. The pH of the resulting reaction solution is then adjusted to near neutral, approximately 6-8 before isolation. Outside of this pH range there is danger of hydrolysis of the product. One normally uses low temperatures for the salt formation, also, to prevent the dye from gumming. Consequently, the preparation should be carried out below 50° C.

It is an advantage of our invention that these arylguanidine salts of sulfonated nigrosines have good solubility with a minimum of insoluble material in solvent vehicles used in ball point pen formulations, such as Carbitol, 1,3-butyleneglycol and propylene glycol. It is a further advantage of our invention that they are compatible with other spirit soluble colors used in ball pen inks which can be added later to the solution in the vehicle. The shading dyes are usually other spirit soluble colors or fatty acid salts or basic dyes as, for example, methyl violet oleate.

It is a further and especial advantage of our invention that these arylguanidine salts of sulfonated nigrosines form solutions in glycol with viscosities in the range of 5000 to 20,000 centipoises at 25° C. Such a viscosity range in this reagent is a necessary characteristic for a ball point pen ink. Without such a characteristic the ink will either flow too freely from the pen or will not flow at all. The high solubility is also surprising in that it would not have been expected that a molecule of such a high molecular weight would have such high solubility. The high solubility is extremely important since very concentrated solutions are necessary, often in the order of as much as 40 parts of dye to 30 parts or less of solvent. It is also rather surprising that such a large molecule having so many sulfonic acid groups would have such a high solubility in organic solvents, even in the form of a partially neutralized salt.

In general the salts of our invention have extremely high tinctorial power giving jet black hues with excellent light fastness. In fact, the light fastness is of an order not usually obtainable heretofore for jet black ball pen inks.

Our invention can be illustrated by the following examples in which parts are by weight unless otherwise specified.

*Example 1*

To 3,500 parts of water is added 400 parts of sulfonated nigrosine (14% sulfur) containing a total of 1.75 atoms of sulfur. The mixture is stirred to complete solution at about 26° C. and the pH is then adjusted to 8.1 by the addition of approximately 20 parts of 50% sodium hydroxide solution. 2.5 parts of filter aid (Hyflo-Supercel) is added and the solution is clarified and diluted with water to approximately 6,000 parts.

A solution of 420 parts of di-o-tolyl-guanidine (1.76 moles) in 2,500 parts of water and 160 parts of hydrochloric acid is prepared at room temperature. After adjusting the pH to about 6–7 by the addition of a small amount of dilute caustic, the solution is clarified by filtration and diluted to about 7,000 parts with water.

The clarified di-o-tolyl-guanidine hydrochloric solution is added gradually to the sulfonated nigrosine solution giving a mixture with a pH of about 5.1. After adjusting the pH to about 6.6, the slurry is then stirred a short time at about 30° C. The solid product is removed by filtration, washed well with cold water and dried at about 50° C., giving 606 parts of the product.

*Example 2*

16,600 parts of an aqueous solution of sulfonated nigrosine containing 4000 parts of sulfonated nigrosine, analyzing 13.95% sulfur, is adjusted to a pH of 8–8.5 by the addition of 5% sodium hydroxide solution. The solution is clarified, using a filter aid and then diluted to about 70,000 parts by the addition of water.

A solution is prepared containing 5,000 parts of di-o-tolyl guanidine, dissolved in 5,000 parts of water, and 2,420 parts of 20° Bé. hydrochloric acid. The solution which is diluted to approximately 65,000 parts by the addition of water, is clarified and is then made up to about 70,000 parts with water.

The amine hydrochloride solution is added to the sulfonate nigrosine solution over a 20–30 minute period at 25–38° C. while maintaining the pH between 6 and 8 by the addition of sodium hydroxide solution. The product precipitates as a black precipitate and after stirring for an additional period is removed by filtration, washed with water, and dried at 40–45° C., giving approximately 6,000 parts of dry dye.

A solution of this dye in Carbitol at a concentration of 40 g. of dye in 30 g. of the solvent has a viscosity of 90,400 centipoises at 25° C. When dissolved in 1, 3-butylene glycol at a concentration of 40 g. of dye in 60 g. of solvent, the viscosity is 6,240 centipoises at 25° C. Microscopic examination of the butylene glycol solution showed very few insolubles present.

*Example 3*

100 parts of Water Black SR sulfonated nigrosine with 14% sulfur or a total of 0.44 atom is dissolved in 875 parts of water and the pH is adjusted to 8 to 8.5 with sodium hydroxide. The solution is clarified using filter aid and the filtrate is made up to about 1,750 parts by the addition of water.

A solution of 82.3 parts of di-o-tolyl guanidine and 24.2 parts of diphenyl guanidine is prepared in 50 parts of water and 53.3 parts of 20° Bé. hydrochloric acid, with warming to complete solution. The solution is diluted to approximately 1,600 parts, clarified to remove insoluble material and then made up to a volume of about 1,750 parts by adding water. (The amount of amine used is about 0.46 mole for 100 parts of the dry Water Black SR).

The amine hydrochloride solution is added to the nigrosine solution gradually while maintaining the temperature at 23–25° C. and keeping the pH between about 6 and 8 by the addition of sodium hydroxide solution. The product separates as a black solid which, after being stirred a short time, is removed by filtration, washed with water and dried.

*Example 4*

100 parts of a sulfonated nigrosine analyzing 13.07% sulfur is dissolved in 850 parts water. The solution is clarified by filtration through a filter aid and then made up to a volume of 1,750 parts with water. The pH is adjusted to 7.0–7.5 with 50% caustic.

85 parts of mixed dixylyl guanidines (M.W. 267.2) is dissolved in 50 parts water and 31.3 parts concentrated C.P. hydrochloric acid (37.5%). The solution is diluted to approximately 850 parts with water, clarified and the clarified liquor made to a volume of 1,200 parts with water.

The amine solution is added to the nigrosine solution gradually while maintaining the temperature at 28–30° C. and the pH at 6.5–7.0 with 50% caustic. A black, insoluble precipitate forms and is filtered off after being stirred for a short time. The precipitate is washed with 2,000 parts water containing 4.25 parts of mixed dixylyl guanidine. This is followed by a water wash.

The product is air dried to remove most of the water, then dried at 60° C. to constant weight.

*Example 5*

The mixed dixylyl guanidines used in Example 4 is prepared as follows. 556 grams mixed xylidines is added to a 1-liter flask equipped with mercury-sealed type stirrer, thermometer, condenser, gas inlet tube and high temperature pH electrodes. 280 milliliters of water are added and the mixture is heated to 90–95° C. Cyanogen chloride gas is added with stirring through the gas inlet tube as rapidly as absorbed at 90–95° C. until the pH drops to 2.5. The reaction is heated to 98–100° C. for three hours. The solution is adjusted to a pH of 6.5 with caustic (20 grams per 100 ml.).

The neutralized mass is steam stripped until free of any unreacted xylidines, then added to 4,000 parts water containing 17 g. of activated charcoal and 47 parts of filter aid, stirred one hour and clarified. The filtrate is added to 6,000 ml. of water containing 485 g. of caustic and iced to 5° C. The solution is alkaline to phenolphthalein at the end of the filtrate addition. A white precipitate which forms is filtered off, washed free of chlorides and excess caustic, then dried at 60° C. to constant weight.

*Example 6*

The procedure of Example 2 is followed, using in place of the di-o-tolylguanidine used there an equivalent quantity of each of the guanidines listed below giving in each case is ball pen ink color. The amines used are:

diphenylguanidine
di-o-ethylphenylguanidine
phenyl-o-tolylguanidine
di-o-anisylguanidine
o-tolyl-xylylguanidine
phenyl-o-ethylphenylguanidine
o-tolyl-o-ethylphenylguanidine
phenyl-xylylguanidine
xylyl-o-ethylphenylguanidine

We claim:

1. Aryl guanidine salts of sulfonated nigrosines, the said sulfonated nigrosines having from 8–15% by weight sulfur content, there being from 0.5 to 1.0 mole of said aryl guanidine per atom of sulfur; the said aryl group being a carbocyclic 6-membered monocyclic aryl radical free of salt forming groups.

2. The salts of claim 1 in which the aryl guanidine is diorthotolyl guanidine.

3. The salts of claim 1 in which the aryl guanidine is a mixture of di-o-tolyl guanidine and di-phenyl guanidine.

4. The salts of claim 1 in which the aryl guanidine is di-o-ethylphenyl guanidine.

5. The salts of claim 1 in which the aryl guanidine is phenyl-o-tolyl guanidine.

6. The salts of claim 1 in which the aryl guanidine is dixylyl guanidine.

7. The salts of claim 1 in which the sulfur content of the sulfonated nigrosine is at least 10% and the aryl guanidine is used in a proportion of at least 0.9 mole per atom of sulfur.

References Cited in the file of this patent

UNITED STATES PATENTS

| | | |
|---|---|---|
| 1,674,128 | Rose | June 19, 1928 |
| 2,328,759 | Wahl | Sept. 7, 1943 |

OTHER REFERENCES

Venkataraman: "Synthetic Dyes," vol. II, p. 775 (1952).

UNITED STATES PATENT OFFICE

CERTIFICATE OF CORRECTION

Patent No. 2,990,405 June 27, 1961

Foster L. Pepper et al.

It is hereby certified that error appears in the above numbered patent requiring correction and that the said Letters Patent should read as corrected below.

Column 5, line 13, for the claim reference numeral "1" read -- 6 --.

Signed and sealed this 5th day of December 1961.

(SEAL)
Attest:

ERNEST W. SWIDER
Attesting Officer

DAVID L. LADD
Commissioner of Patents
USCOMM-DC